United States Patent
Ay et al.

(10) Patent No.: US 9,016,642 B1
(45) Date of Patent: Apr. 28, 2015

(54) RECONFIGURABLE HANGING DEVICE WITH INTEGRAL RETENTION MEMBER

(71) Applicant: Action Items, Inc., Sebastopol, CA (US)

(72) Inventors: Charles Ay, Trabuco Canyon, CA (US); Richard A. Brody, Sebastopol, CA (US)

(73) Assignee: Action Items, Inc., Sebastolpol, CA (US)

( * ) Notice: Subject to any disclaimer, the term of this patent is extended or adjusted under 35 U.S.C. 154(b) by 136 days.

(21) Appl. No.: 13/767,475

(22) Filed: Feb. 14, 2013

Related U.S. Application Data

(60) Provisional application No. 61/605,825, filed on Mar. 2, 2012.

(51) Int. Cl.
  *F16B 45/00* (2006.01)
  *F16M 13/02* (2006.01)

(52) U.S. Cl.
  CPC ............... *F16M 13/02* (2013.01); *F16B 45/00* (2013.01)

(58) Field of Classification Search
  USPC ............ 248/691, 304, 308, 301, 339; 211/99, 211/100, 171, 86.01, 87.01, 89.01, 95, 96
  See application file for complete search history.

(56) References Cited

U.S. PATENT DOCUMENTS

| | | | |
|---|---|---|---|
| 633,742 A | 9/1899 | Turner | |
| 1,435,889 A | 11/1922 | Barker | |
| 1,461,938 A | 7/1923 | Rose | |
| 1,587,676 A | 6/1926 | Patterson | |
| 2,071,257 A * | 2/1937 | Hansen | 248/294.1 |
| 2,077,629 A | 4/1937 | Lahr | |
| 2,429,041 A * | 10/1947 | Anderson | 211/100 |
| 3,289,989 A | 12/1966 | Ferenz | |
| 3,385,547 A * | 5/1968 | West | 248/308 |
| 3,941,250 A | 3/1976 | Ott | |
| 4,221,354 A * | 9/1980 | Kempkers | 248/291.1 |
| 4,787,590 A | 11/1988 | Melvin | |
| 4,901,866 A | 2/1990 | Barella | |
| 5,950,845 A * | 9/1999 | Harris | 211/100 |
| 6,457,690 B1 | 10/2002 | Spykerman et al. | |
| 6,663,067 B2 | 12/2003 | Gordon | |
| 6,935,601 B2 * | 8/2005 | Tanaka | 248/294.1 |
| 6,991,204 B2 * | 1/2006 | Ay | 248/308 |
| 7,118,082 B2 * | 10/2006 | Brnjac | 248/308 |
| 7,131,616 B2 * | 11/2006 | Livingstone | 248/304 |
| 7,669,821 B2 | 3/2010 | Martin | |
| D613,954 S | 4/2010 | Sammerhammer et al. | |
| 8,079,446 B2 * | 12/2011 | Nemoto | 185/40 H |
| 8,240,625 B2 * | 8/2012 | Kato | 248/304 |
| 8,376,300 B2 * | 2/2013 | Nishida et al. | 248/304 |
| 2003/0141423 A1 * | 7/2003 | Gordon | 248/304 |
| 2010/0320345 A1 | 12/2010 | Huang | |

* cited by examiner

*Primary Examiner* — Alfred J Wujciak
(74) *Attorney, Agent, or Firm* — Rosenberg, Klein & Lee

(57) ABSTRACT

A reconfigurable apparatus for hanging support of articles is provided. The reconfigurable apparatus provides a hanging member that, responsive to user actuation, transitions between a stowed position and an operative position to thereby reconfigure the hanging apparatus between operative and stowed configurations. In a stowed configuration, the hanging member may be substantially flush with a frame or faceplate of the apparatus. Such reconfigurable hanging apparatus may be substantially flush-mounted with a wall to avoid injury thereon, to maintain a decor, and to provide flexibility in placement of wall-abutting furnishings. The hanging member is retained until user actuation sufficient to overcome a retention member therein.

11 Claims, 9 Drawing Sheets

RECONFIGURABLE HANGING DEVICE WITH INTEGRAL RETENTION MEMBER

RELATED APPLICATIONS

This is a Non-Provisional Application based on U.S. Provisional Application No. 61/605,825 filed 2 Mar. 2012, currently pending.

BACKGROUND OF THE INVENTION

The present invention is generally directed to hanging devices, and more particularly to a hanging device which includes a hanging member which is safely disposed in a recessed manner within a body maintaining a substantially flush inconspicuous disposition with a wall or mounting site when not in use (or in a stowed configuration). The hanging member thereof is rotatable about an axis to extend out of the body while remaining solidly anchored so that even a heavy item may be hung from it securely. More specifically, the hanging device incorporates a retention member, which reliably keeps the pivotally held hanging member in a safely retracted or stowed position when not in use but allows for ready reconfiguration to an operative position.

Hanging devices are generally used to provide a location at which items or articles may be hung without the use of a coat hanger. Conventionally, hanging devices are generally in an operative state even when not in use. Such default operative-only configuration represents a significant drawback of using such a device. A number of articles such as a wet coat, jacket, purse, laptop bag, seasonal decorations, temporary lighting, and the like are beneficially maintained in an organized and securely maintained manner. Rather than haphazardly depositing such items about an office, a house, a school, a recreational vehicle, or a boat—instead, a device to securely deposit such articles would prove quite convenient, beneficial, and safe. As some articles may be wet, hanging them facilitates the drying process by keeping the articles suspended rather than clumped or piled—allowing air to permeate the article and liquids to drip therefrom resulting in a conveniently placed, air-dried article. Additionally, such wet articles are generally hung immediately upon walking into a room, house, office, or the like so as to confine the dripping to the entrance-area. It is seen that these items are frequently deposited and withdrawn from their temporary storage. Some other articles, such as seasonal decorations generally stay up a short period of time and then are removed.

Installing permanently disposed rigidly protrusive hanging measures for only transient hanging needs is far from optimal. A number of factors or motivators may make the permanent affixing of hanging measures undesirable such as the expense of permanent affixing, a degraded aesthetic appearance, reduced usable space, constraints on arrangement of wall-abutting furniture, and safety concerns including compliance with both federal and state Occupational Safety and Health Administration (OSHA) guidelines or rules barring dangerous protrusive members from hallways, stairways, entranceways or other such inherently dangerous areas.

It may be seen that fixed hanging measures rigidly protruding several inches in some environments, such as, for example, a narrow dark stairwell, a bustling restaurant, an industrial area, a boat pitching on the high seas, an RV cresting a hill, or a school or play area for children may result in serious injury—especially as such rigid unyielding fixtures are generally disposed at eye-level for their intended user. A simple trip may result in severe, life changing, eye or facial damage. More commonly, such affixed rigid protruding members may simply be an annoyance or embarrassment, perhaps catching a shirt of a passer-by, nicking another passer-by, or bringing another passer-by to a jolting halt as their sweater has been caught by the hook—arresting their forward motion and perhaps spilling hot coffee everywhere.

Permanently affixed rigid protrusions, such as hooks, pegs, pikes, nails, and the like may also serve as an eyesore—disrupting an otherwise pleasant ambience in a nice restaurant, attracting a motley array of rain jackets in an austere Courtroom, or an indistinguishable black mass of jackets at a funeral. An otherwise fashionable room may be tarnished by a lone rusty nail hastily hammered into a wall or door to serve as a coat hanger.

Additionally, surface-affixed rigid permanent hooks may be insufficiently anchored to an infirm surface such as drywall in haste—perhaps missing the stud or using less than adequate screws. Such hooks, when burdened with several wet jackets or a laptop bag, may pivotally rip their anchoring screw out of the wall resulting in unsightly holes in the wall, a plastery mess, metallic screws on the floor, and perhaps a broken laptop.

Moreover, fixed hooks protruding into a room put unnecessary constraints on the arrangement of furniture in the room. If a remodeler were trying to move a cabinet or bookshelf to a certain position to make room for a couch, the fixed rigid hook member may be in an inopportune location requiring several different layouts or schematics to arrange a floor-plan distributing furniture ideally in the room in light of the fixed hook. Fixed, rigidly protruding hooks installed on the back of a door may also be seen to damage an opposing wall when the door is opened.

To some degree, retractable hooks, such as, for example, seen in U.S. Pat. No. 6,991,204 (the '204 patent) have been adopted to counter some of the disadvantages of fixed rigid permanent hooks discussed above. However the retracting hook seen in the '204 patent has no measures to ensure that the hook portion stays in a retracted or safely stowed state guarding against accidental extensions. Additionally, the hook seen in the '204 patent has no measures for flush mounting within a wall, toolbox, door, or the like.

In some cases of other retractable hooks, unreliably retraction of the hooks can be even more dangerous. If, for example, a retractable hook which either retracts too far—leaving a void, or which retracts only partially—leaving a small hook portion exposed is utilized, injuries may be exacerbated. Such over or under retractions are often inconspicuous—though sufficient to snag a sweater or gouge an arm.

Worse yet, is a retractable hook that retracts or extends unreliably or without being actuated by an adult. A stubborn retractable hook may cause a child to use a great amount of force to dislodge the hook which may result in great shock or trauma when a hook gives out or the obstacle is overcome and the hook snaps into position. Alternatively, a retractable hook that retracts or extends too easily or even on its own responsive to gravity, seismic activity, the shuffle of school children en masse, or the like, may lure a child into a false sense of security that, for example, safe running passage may be assumed as the hook is in a retracted position—only to be unsuspectingly snared by a rogue extending hook. While such hook accident may seem relatively minor, it is seen that such hooks, particularly in an elementary school, middle school, hospital, retirement center, or the like, may be handled by hundreds of children or patients with unwashed hands, janitors, teachers, parents, nurses, doctors, care givers, and thus, such hooks may be vectors for a number of diseases, bacteria, viruses, and the like,—such as, for example, tetanus which may result in death or disfigurement should a wound go unreported by a child/patient/senior or unaddressed by competent medical professionals.

Alternatively, coat racks and other free-standing apparatuses may be employed to provide a place to hang an article temporarily. However, coat racks are eventually filled with discarded articles, found articles, or so many layers of articles that locating a particular article quickly becomes a fruitless endeavor. Such coat racks may become so over-loaded and off balance that a simple touch may topple the coat rack—potentially injuring a child or senior in the process. Such coat racks also take up a not-insubstantial footprint and are generally unattractive. Additionally, they may not provide the flexibility for desirable hanging of such articles as seasonal decorations.

Affixing seasonal decorations, while seemingly innocuous, may be a hazardous activity, where employees employ ladders, chairs, desks, and all manner of unorthodox stepping and reaching measures to hang decorations such as wreaths, lights, stockings full of gifts, mistletoe, and the like with industrial tools and fasteners such as stapleguns, nailguns or hammers, nails, and the like—attempting to create impromptu hanging devices. Often times, grievous injuries are encountered in the stepping, reaching, affixing, and the inevitable failed fixture dropping a poorly hung object on an unsuspecting person's head.

Installing and uninstalling temporary hooks is also far from optimal as repeated installations may damage the substrate, wall, or hanging surface with unsightly holes, residual adhesive, discolorations, and the like. More seriously, throughout the years, the repeated penetration and retraction may structurally weaken a localized area of the surface such that each successive installation becomes less and less reliable. Hanging objects have a potential energy related to their weight and height. The heavier the object, the higher it is hung, the greater the kinetic energy unleashed from its potential should the object fall.

There is therefore a need for a reconfigurable hanging device maintaining flush disposition in stowed configuration. Such hanging device should not be susceptible to false actuations, but instead remain steadfast in stowed configuration until an authorized adult applies a simple actuation with a predetermined requisite amount of force to overcome a safety retention member thereof. Such device shall retract fully to be disposed in flush relation with at least a frame of the device but also, in some embodiments, a wall or other mounting surface thereof. Such hanging device shall extend fully to provide safe and secure support for even relatively heavy objects and such device shall retract effectively and fully.

SUMMARY OF THE INVENTION

It is an object of the present invention to provide a reconfigurable hanging device for use in connection with interior and exterior surfaces of homes, apartments, commercial buildings, industrial buildings, vehicles, toolboxes, and the like.

An object of the invention is to provide a hanging apparatus which can easily and quickly be attached to or embedded in a variety of surfaces, including but not limited to drywall, concrete, metal, plaster, wood, and tile.

Another object of the invention is to provide a hanging device that is reconfigurable between operative and a default stowed configuration, where the device is effectively integrated into a surrounding surface, and when stowed, remains substantially unobtrusive or flush in surface profile.

Another object of the invention is to provide a hanging device that retains a selected configuration until a threshold force has been exceeded to trigger reconfiguration thereof.

These and other objects are attained in a reconfigurable hanging apparatus formed in accordance with the present inventions. The reconfigurable hanging apparatus comprises a housing having a frame portion and first and second recessed portions formed therein. The housing includes a retention member disposed at the first recessed portion, with the second recessed portion defining an inclined support surface. A hanging member is coupled to the housing for angular displacement between stowed and operative positions relative to the housing. The hanging member includes first and second body portions and at least one protuberant portion formed on at least one of the first and second body portions, the second body portion defining an inclined countersupport surface. The inclined countersupport surface bears against the inclined support surface when the hanging member is in the operative position, and the protuberant portion deflectively engages the retention member of the housing when the hanging member is displaced to pass between the operative and stowed positions.

In certain embodiments, a hanging assembly configured to be substantially flush mounted to a wall surface comprises a surface mountable structure having a planar front surface defining a groove formed therein, the groove having a first sidewall and a second sidewall extending from a rear wall. A hook member is configured to be displaceably coupled within the groove between the first and second sidewalls, the hook member being displaceable between extended and retracted positions. The hook member includes an outer surface defining in the retracted position a substantially flush outer surface profile with the surface mountable structure, and including an inner surface and an inclined surface extending at a predetermined angle therefrom. The hook member includes a protrusion formed to extend therefrom between the inner and inclined surfaces thereof. A resilient tab is formed to extend from the rear wall of the surface mountable structure, the resilient tab deflectively engaging the protrusion when the hook member is displaced between the extended and retracted positions thereof. A support portion is integrally formed in the rear wall at an incline opposite the inclined surface of the hook member for counter-support engagement of the hook member substantially at the predetermined angle when in the extended position.

In certain other embodiments, a hanging assembly configured to be substantially flush mounted to a wall surface comprising a surface mountable structure having a planar front surface defining a groove formed therein, the groove having a first sidewall and a second sidewall extending from a rear wall. A hook member configured to be displaceably coupled within the groove between the first and second sidewalls. The hook member is displaceable between extended and retracted positions, and includes an outer surface defining in the retracted position a substantially flush outer surface profile with the surface mountable structure. The hook member includes an inner surface and an inclined surface extending at a predetermined angle therefrom, as well as a protrusion formed to extend therefrom between its inner and inclined surfaces. The hook member has formed thereon an arcuately profiled ridge protrusion extending transversely thereacross. A resilient tab is formed to extend from the rear wall of the surface mountable structure, the resilient tab deflectively engaging the protrusion when the hook member is displaced between the extended and retracted positions thereof. The resilient tab includes a terminal part peripherally defined by a substantially U-shaped cutout formed in the rear wall of the surface mountable structure to be resiliently suspended therefrom. A support portion is integrally formed in the rear wall at an incline opposite the inclined surface of the hook member for counter-support engagement of the hook member substantially at the predetermined angle when in the extended position. The resilient tab deflects from a base configuration to an intermediate configuration when the hook member protrusion partially engages the gap, the resilient tab returning substantially to the base configuration when the hook member protrusion fully engages the gap.

Additional aspects and details will be set forth in the Description which follows and, in part, will be apparent from the Description and Figures.

DETAILED DESCRIPTION OF THE PREFERRED EMBODIMENTS

The subject system provides for a reconfigurable hanging device maintaining substantially flush disposition in a stowed configuration. The device is reconfigurable between operative and a default stowed configuration, where the device is effectively integrated into a surrounding surface to remain substantially unobtrusive or flush in surface profile until reconfigured into operative configuration. The hanging device retains a selected configuration until a threshold safety force has been exceeded to trigger reconfiguration of the hanging device.

Figures 4A, 4B:
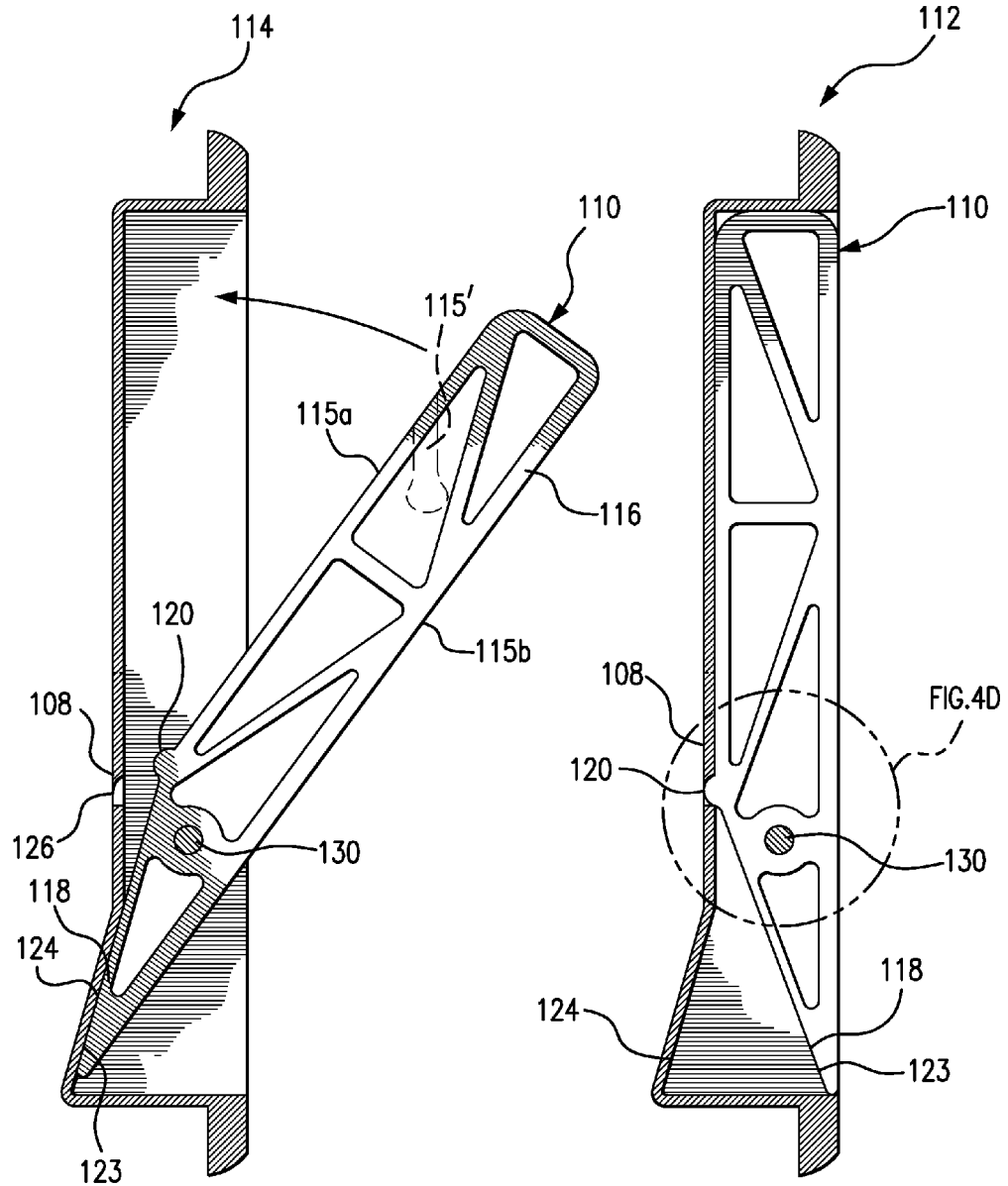
FIG. 4A is a side profile view of the hanging device in the operable configuration in accordance with the exemplary embodiment of the present invention.
FIG. 4B is a side profile view of the hanging device in an stowed configuration.
Figure 4C:
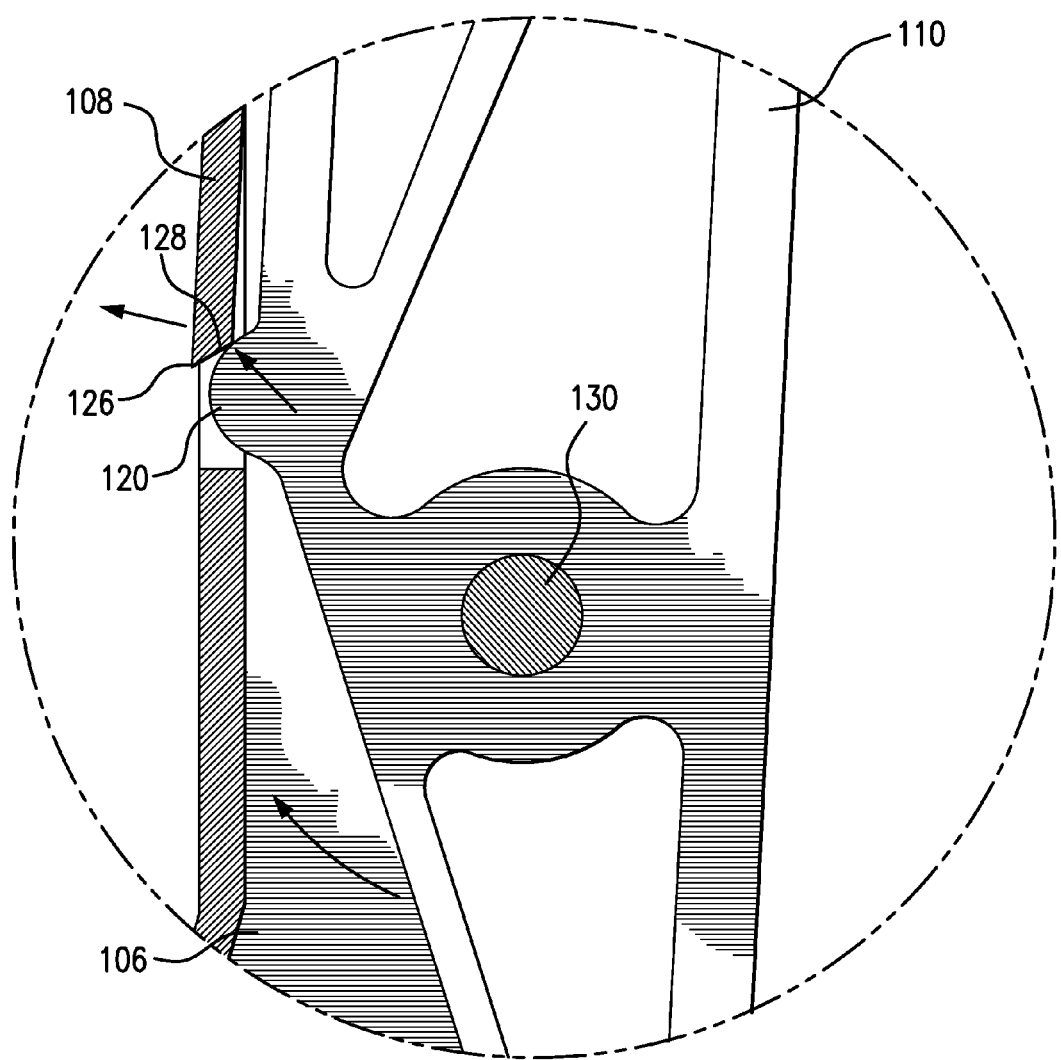
FIG. 4C is a cut-away view of FIG. 4B illustrating an exemplary transition between stowed and operable configurations.
Figure 4D:
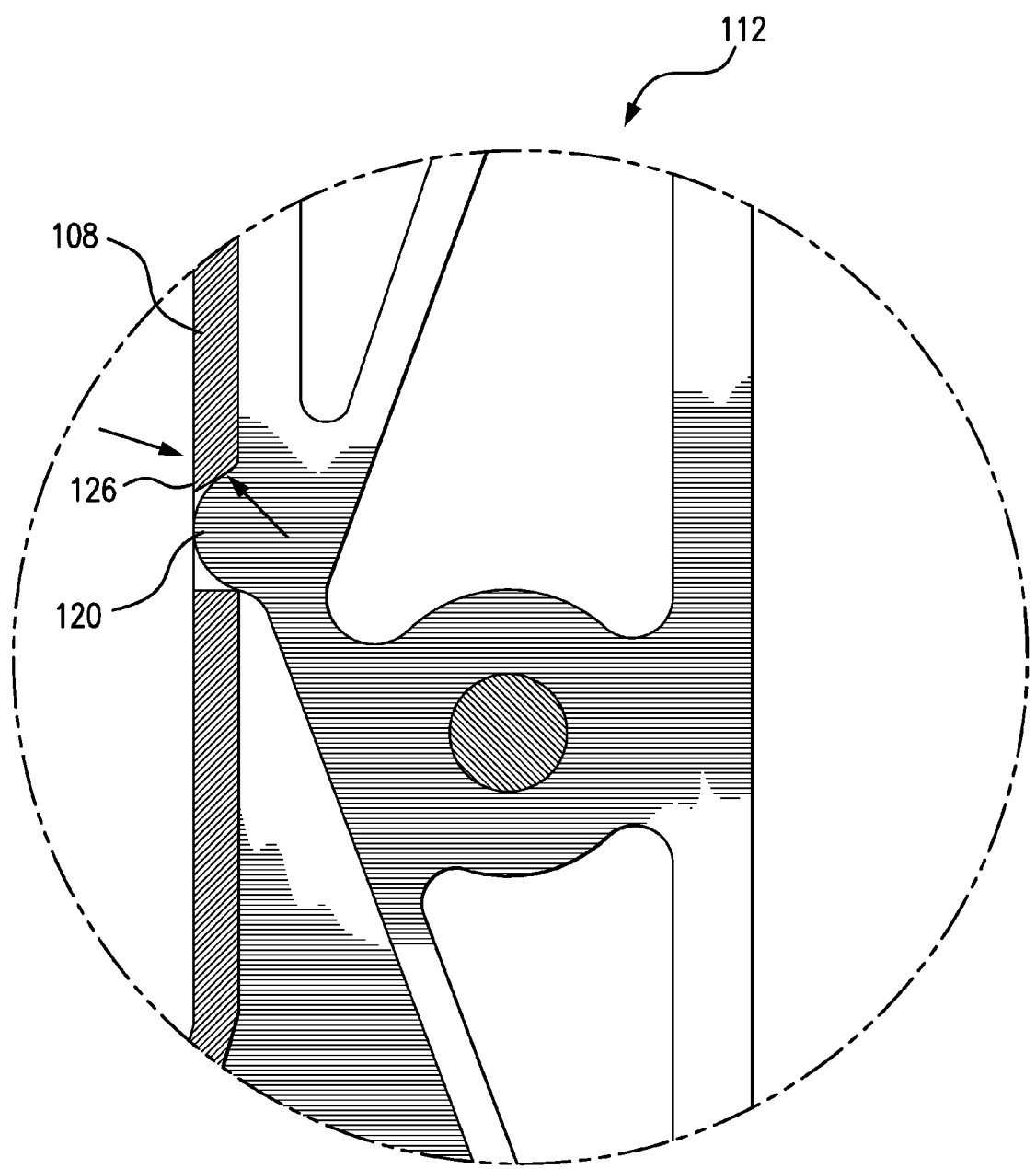
FIG. 4D is a cut-away view of FIG. 4B illustrating the stowed configuration.
Figure 5:
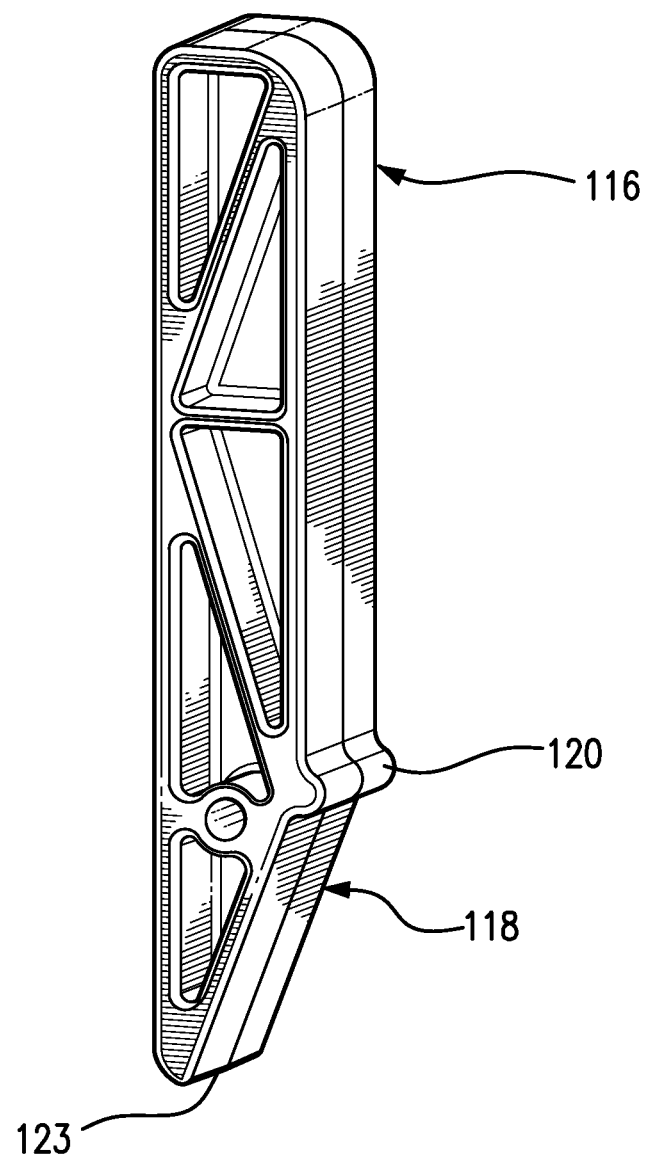
FIG. 5 is an exploded perspective view of the hanging member.
Figure 6:
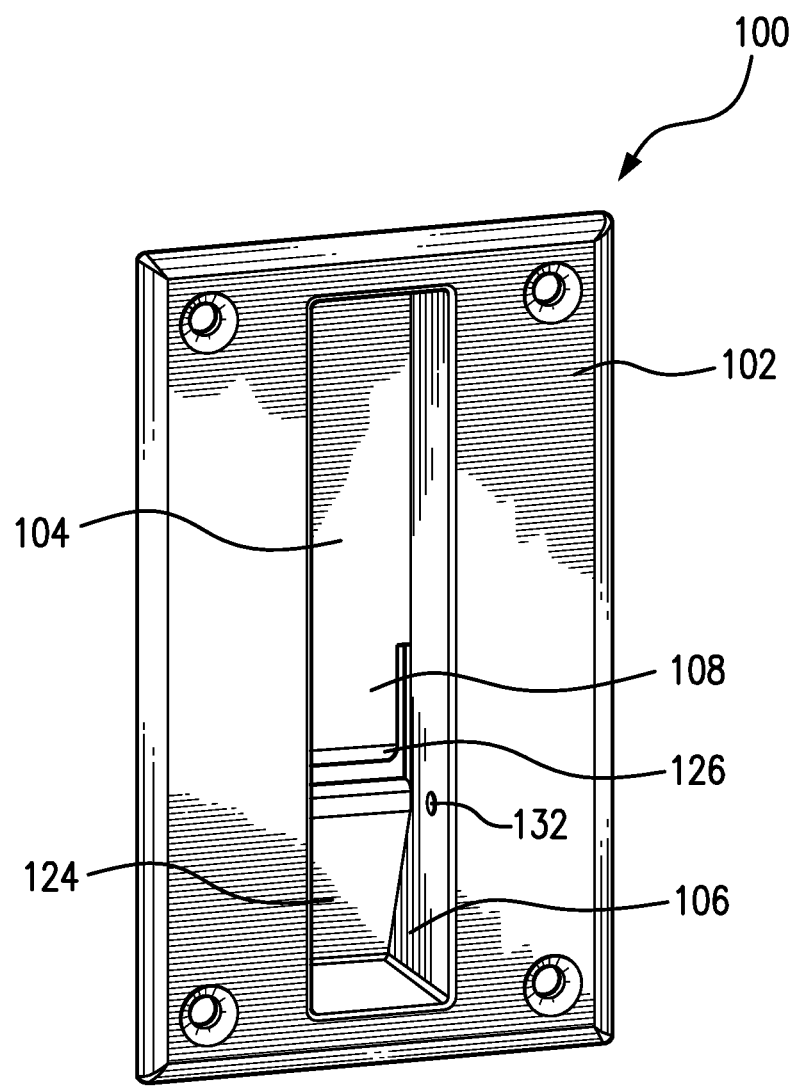
FIG. 6 is an exploded perspective view of the hanging device frame.

Referring to FIGS. 1-6, there is an illustrative depiction of an exemplary embodiment of the hanging device. Such hanging device may be installed, for example, in recreational vehicles, boats, motor homes, truck cabins, tool boxes, benches, doors, and the like oriented vertically or otherwise. Depending on the illustrated view, all or certain portions of the device are shown in either operative or stowed configuration. For clarity of illustration, some portions are shown in isolation, disassembled from other portions—such as seen in FIGS. 5 and 6.

The device includes a housing 100 which is installed within a given wall surface to be recessed therein. The device further includes a support hook, peg, or hanging member 110 displaceably coupled to the housing 100 within at least one of a first recessed portion 104 or a second recessed portion 106. The recessed portions form a groove defined in the frame portion 102 of the housing 100. Preferably, the hanging member 110 is pivotally coupled to the housing 100 to be angularly displaceable between stowed position 112 (FIG. 4B) and operative position 114 (FIG. 4A) to thereby provide a stowed configuration and an operative configuration for the device. Transitioning between position/configurations is effected by such angular displacement of the hanging member 110 relative to the housing 100 and/or frame 102.

In the stowed position or configuration 112, the hanging member 110 is received within the recessed portions or groove collectively formed by the first recess portion 104 and second recess portion 106, such that the hanging member 110's outer exposed surface defines a substantially flush planar profile with the frame portion 102 of the housing 100 (and the surrounding portions of a given wall or other surfaces thereabout). Such stowed configuration 112 is ideal for ensuring safe ingress and egress through a room or hallway especially for children, seniors, and those with reduced mobility. Additionally, such configuration provides for unconstrained room arrangements where, for example, if it was desired, a bookshelf, a headboard, a TV, or the like could be placed to abut the wall portion housing the hanging device without altering the room or removing the hanging device.

In the operative position or configuration 114, the hanging member 110 is extended outwards from the housing 100 at a predetermined angle to provide a ready structure for hanging objects surely or providing support. Preferably, the predetermined angle is not more than 90° from the stowed position 112—although any suitable angle for providing support may be provided. While the hanging member 110 is shown in the exemplary embodiment disclosed with a substantially straight inner surface 115a (FIG. 4A) on which to hook an object to be hung therefrom, the hanging member 110 may be formed in certain alternate embodiments with any other suitable shape and configuration. So long as they do not interfere with the disclosed device operation, the hanging member may be equipped with such features, for example, as a hanging notch 115' to retentively receive the upper hook of a coat hanger, the hanging loop of a garment, the strap of a bag, or the like. In certain other embodiments, supplemental hanging structures like hooks or notches, for example, may be accessibly formed recessed into or extending from even the outer surface 115b if suitable for the particular application intended. Various other features for enhancing its hanging/retention function may be suitably configured into or onto the hanging member 110 in alternate embodiments.

The frame portion 102 of the housing 100 defines the recessed portions (first recessed portion 104 and second recessed portion 106) that receive the hanging member 110 when retracted to its stowed position 112. The frame portion 102 includes a resilient retaining structure or safety retention member 108, such as, for example, a snap retention member or a cam lock, and an inclined support surface 124. The retention member 108 is integrally formed in the recessed portion such as, for example, by molding, mechanical stamping, cutting, or the like, though any suitable formation may be employed. Alternatively, resilient retention member 108 may be coupled to the frame 102 or the housing 100 by any suitable measures such as, by adhesive, welding, stamping, or the like.

Figure 2A:
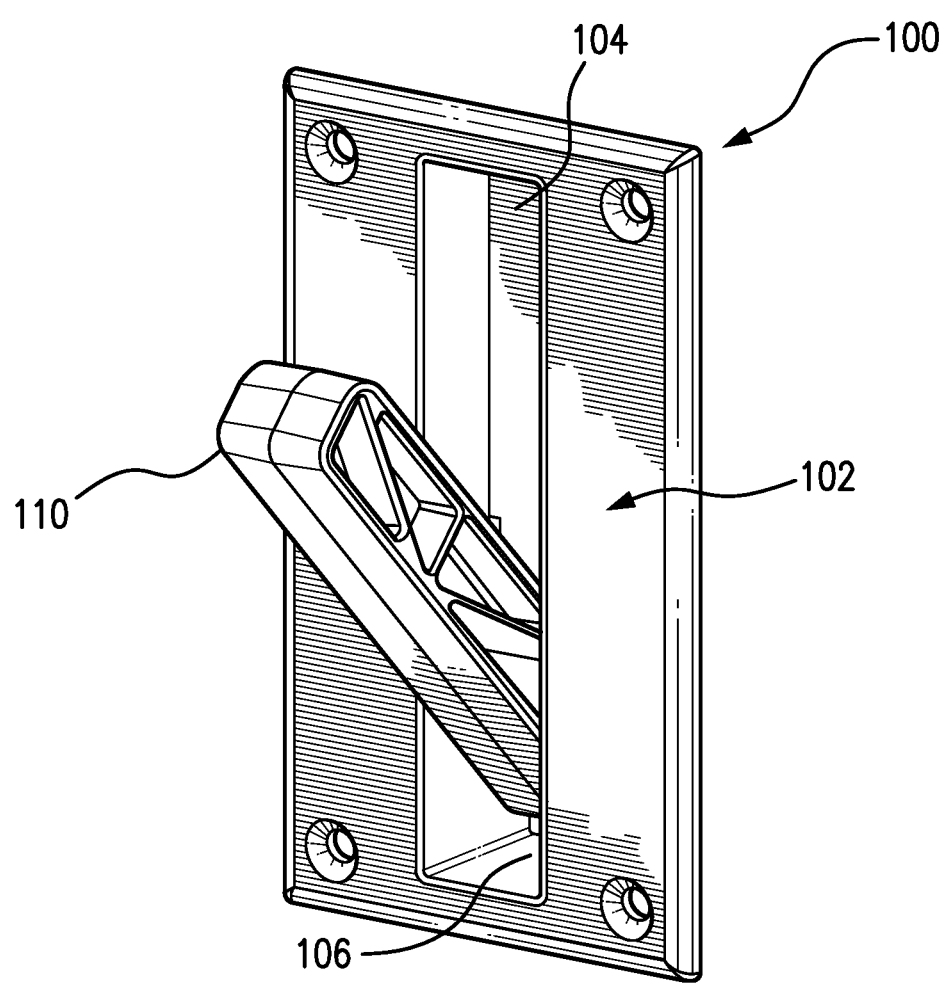
FIG. 2A is an exemplary perspective diagram illustrating the hanging device in an operative configuration in accordance with an exemplary embodiment of the present invention.
Figure 2B:
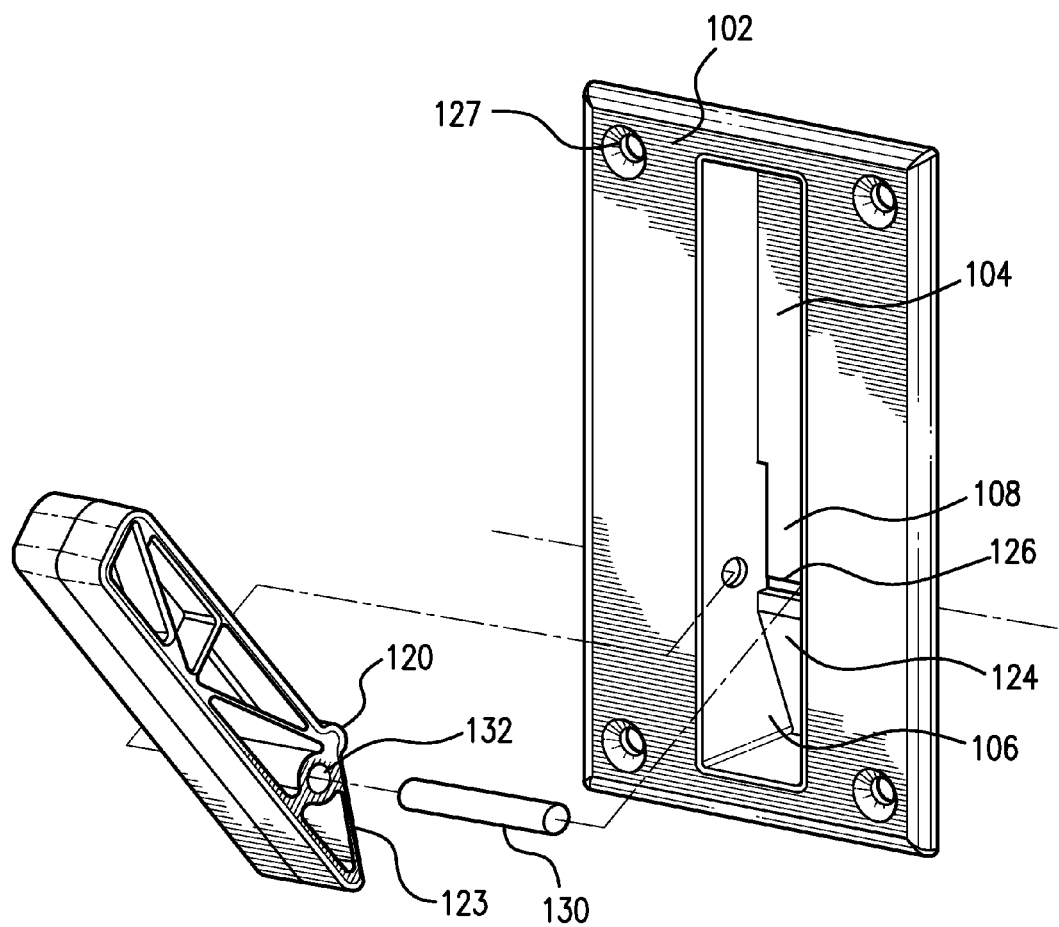
FIG. 2B is an exploded view of the hanging device depicted in FIG. 2A.
Figures 3A, 3B:
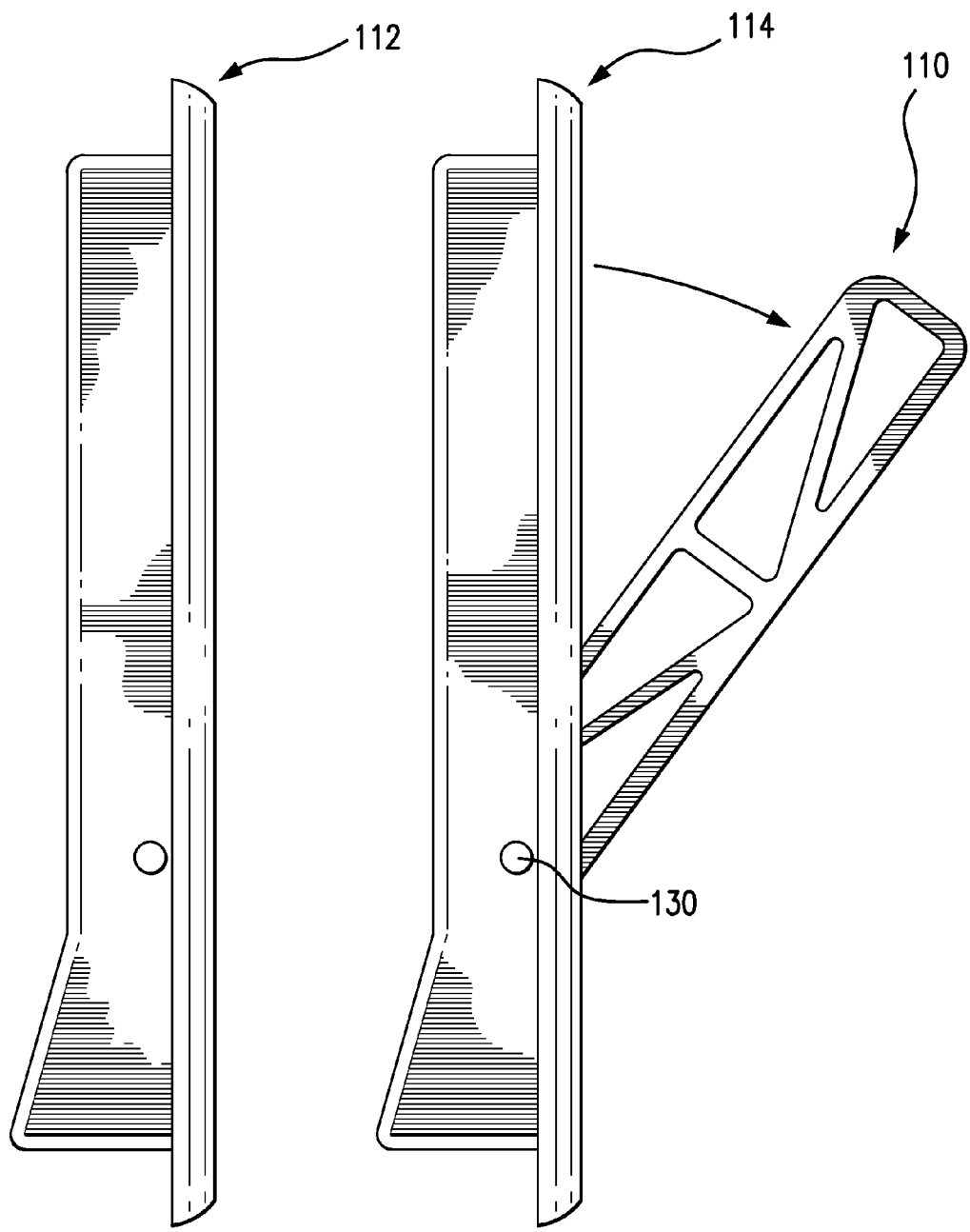
FIG. 3A is a partial view illustrating the frame portion of the hanging device in accordance with the exemplary embodiment of the present invention in a stowed configuration.
FIG. 3B is a partial view of the hanging device in accordance with the exemplary embodiment of the present invention in an operable configuration.

The hanging member 110 may be a solid member or, as seen in FIG. 2B, preferably has portions which do not substantially contribute to structural strength removed for materials savings and to make the hanging member 110 more lightweight—yet still substantially retain the structural strengths of a solid member. Hanging member 110 includes a throughole 132 for receiving a pin 130 to displaceably couple hanging member 110 with the frame 102 of housing 100 as a pivot point. Throughole 132 generally demarcates first portion 116 of hanging member 110 from the second portion 118 where the first portion 116 will provide support for articles placed thereon in a cantilevered manner using the pivot point 130 as a fulcrum, and a support face 124 of frame 102 of the housing 100 as a support.

The second portion 118 is formed below the pivot point 132 with a complementary inclined/sloped face to the support surface 124. A countersupport surface 123 of the second body portion 118 is configured to abut the inclined support surface 124 for providing stopping support for the hanging member 110. Thus, when a downward force is applied by the weight of an item hung or supported on the hanging member 110, the planar engagement against the inclined support surface 124 of the housing 100 provides an angular stop, which maintains a strong, stable counter force to uphold the hanging member 110 and any articles supported on a protruding first body portion 116 thereof.

The relative angles of the opposing inclined faces of inclined support surface 124 of the recessed portion 106 and the countersupport face 123 of the second body portion 118 of the hanging member 110 are suitably set to keep the hanging member 110 disposed at a predetermined angle relative to the housing 100 when extended to its operative position 114. The preferred predetermined angle is approximately 40°; however, any other angle suitable for the particular application intended may be used. For example, hanging member 110 may be established to provide a 90° angle relative to the frame 102 or housing 100 where the summation of angles of inclined countersupport portion 123 of the second portion 118 and inclined support surface 124 may be established to equal 90°, such as by setting the countersupport portion 123 for instance to 45° and inclined support surface 124 to 45°. Alternatively, support surface 124 may be set to 80° while inclined countersupport portion 123 is set to 10°. Any suitable complementary set of angles summed to arrive at the predetermined angle for hanging member 110 relative to the housing 100 may be employed. Indeed, any predetermined angle between hanging member 110 and housing 100 may be employed herein for the operative configuration 114. However, it is to be noted that the smaller the predetermined angle, the less supportive surface area will be available on the first portion 116 of the hanging member 110 for supporting articles thereon. Varying the angular difference between the rear wall defining the recessed portion 104 and the supportive surface 124 will affect the vectoring of the force occasioned by the weight of the supported article. The greater the angular divergence between the supportive surface 124 and housing 100, the greater the depth of the housing 100 that will be required. By extension, in some installations, depth of the housing 100 will require a bigger cutout portion of the wall to integrate the housing 100 therein.

The above-noted objects and other objects of the invention may be accomplished in an exemplary preferred embodiment of the invention that includes a rectangular housing 100 containing a plurality of holes (4 in the example illustrated) suitably engaged by fasteners or screws that will pass for secure attachment to a surrounding surface.

The housing 100 may be affixed to a variety of surfaces through various means, depending on both the material used to construct the device and the type of wall surface to which it will be affixed. For example, it is contemplated that the device will be used in connection with residential, commercial, industrial, and marine applications. The device can be affixed to any wall or other surface, oriented vertically or otherwise.

Preferably, the device will be affixed to the wall surface by use of a fastening device such as a mechanical or chemical measure that includes screws, bolts, nails, glue, adhesives, and the like.

The hanging device is preferably formed integral with a surface or recessed into the surface of a given wall or structure. A template may also be supplied with the device to guide a user's proper placement and installation. When installed, the hanging device provides a cinch structure having a selectively stowed or extended configuration from which almost anything may be hung from any type of wall, ceiling, or surface. For example, in various applications, the hanging device may be used to hang towels or anything else in a closet, bathroom, kitchen, or garage.

The hanging device may be employed indoors or outdoors. For example, the hanging device may be used on a structural surface at an outdoor patio area, around a tub, or near a swimming pool to provide ready availability of a structure on which to hang various personal items. In Department Stores, the hanging device may be provided in boxed-in columns typically found in such settings. The device may be integrated into the columns, and remain there all year long without having to be removed during Holiday Seasons or during promotional sale events to accommodate other temporary decorative attachments in their place.

Another example application may be in recreational vehicles (RV). The outside of an RV or mobile trailer home typically offers no suitable place to hang a trash bag, a wet towel, or any other item outside the vehicle. The device may be integrated into the side of the vehicle with suitable installation measures taken to provide adequate sealing against environmental elements.

The hanging device may be formed out of any suitable material known in the art, consistent with the particular requirements of the intended application. It is conceivable that portions of the hanging device may be made out of plastic, metal, wood, or any other material or combinations thereof known in the art which provide sufficient strength and rigidity to provide the required level of support for a given application. All or certain portions of the apparatus may be suitably electroplated with gold, silver, bronze, or even painted to match a surrounding wall. Different applications of the hanging device will determine the particular design parameters required.

The device may also be used in commercial settings, or in conference rooms to provide a place to hang coats, purses, or other personal items. The device may also be used in bathrooms, such as in airports where no adequate provision is normally made to hang a piece of carry-on luggage.

When the indoor hanging device is in stowed position 112, the device takes on the inconspicuous appearance of other more typical devices found on wall surfaces such as electric switches and outlets. In that regard, the stowed device blends into the normal surroundings, and does not protrude obtrusively because of the hanging member 110 being retracted into the recessed portion (first and second recessed portion) of the housing 100.

Another application of the hanging device may be in a public setting such as in a coffee shop, bar, or restaurant. In most typical coffee shops, patrons are sitting at a table with nowhere to hang their personal articles. The hanging device may be attached to the wall, and the patron may deploy the hanging member 110 by simply pushing the bottom of the hanging member 110, allowing the coupling pin 130 to act as a fulcrum point for the first body portion 116 of the hanging member to extend outwardly. To stow the hanging member 110, the user may simply push the hanging member 110 back into the recessed portion by applying enough force to overcome the retention member 108 at the first body portion 116.

In an alternate embodiment, the hanging member 110 is a peg biased for retraction back to its stowed position 112, recessed into the housing 100. A spring or other biasing element may be coupled to the peg and housing to provide a suitable spring bias, such as when an item which had been hung on the hanging member 110 is removed, closure of the hanging member 110 or peg back to its stowed position 112 would occur automatically without further manipulation by a user. Such spring biasing force should be easily overcome, such as by providing a biasing force approaching the weight of a jacket, purse, or other small item. In such manner, even relatively light articles would provide enough force to retain the hanging member 110 in an extended operative position 114. However, a fine balancing act should be performed to determine the optimal biasing force. Such biasing force may be combined with the retention force of retention member 108 to arrive at an easily deployable hanging member 110 via a simple touch on secondary portion 118. A number of factors including ease of deployment, resistance to gravity, jostling, movement, or other unintentional pushes, and ease of stowage may be considered in selectively determining a deflective/frictional engagement force of retention member 108 and any accompanying biasing forces.

Depending on the particular use setting, the hanging member 110 or other portions of the housing 100 may bear certain indicia for instructive, warning, decorative, or promotional purposes. In commercial settings, for example, the hanging member 110 may include the company logo of a given establishment or its commercial partners. Additionally, a target-type indicia may indicate to a user where to push to deploy hanging member 110.

Among other things, the angle at which the hanging member 110 extends from the housing 100 when in operative position 114 will determine its suitability for intended uses. To serve as a shelf support, for example, an angle of extension which approaches 90° is preferably used for the hanging member 110. For the hanging device to serve as a shelf support, a plurality of the devices are disposed along the wall surface, for instance, so that selective ones may be placed into service when desired to cooperatively hold a shelf member.

In a preferred embodiment, the hanging member 110 or peg is formed of a first body portion 116 and a second body portion 118. The second body portion 118 defines an inner engagement end 123 (for engaging the inclined support surface 124 of the housing 100) for example, at an angle of approximately 40° relative to the frame 102. However, any angle suitable to bear the forces occasioned while supporting an article may be used.

The support peg or hanging member 110 is preferably formed with an intermediate portion of its inner side defining a protruding ridge or protuberant portion 120, preferably disposed above the inclined bottom end 123 of second body portion 118. Such protuberant portion 120 is preferably disposed adjacent the pivot point throughole 132 to optimally balance the hanging member 110 to maintain its equilibrium and ensure that the hanging member 110 does not fall into the operative position 114 accidentally. The protuberant portion 120 may be moved higher or lower along the recess and the corresponding hanging member 110, however, the friction-based or deflective forces of the retention member 108 should be selectively decreased in relation to the distance from pivot point 132. Oppositely, the closer the protuberant portion 120 and retention member 108 pair are to the pivot point 132, the stronger the retention force necessary to maintain equilibrium of the hanging member 110. The retention force may be modified by using a suitable material for the retention member 108 of different deflective index according to the retention force necessary to maintain safe equilibrium of hanging member 110. For example, if the retention member 108 and protuberant portion 120 are to be situated higher up on the frame 102 (giving a greater moment arm of hanging member 110 from the pivot point 132) then a less deflective, more rigid material may be selectively employed for retention member 108. Alternatively, the U- or other suitably shaped cut peripherally defining the deflective retention member 108 may be truncated to give less moment arm to the retention member 108 which would effectively require more force to deflect the retention member 108 for displacing the hanging member 110 to transit between operative 114 and stowed 112 positions.

Alternatively, an elastically deformable element may be used to retain the hanging member 110. For example, an elastically deformable element may be interposed between the inclined countersupportive face 123 of the hanging member 110 and the supportive surface 124 of the frame 102. Such elastic deformation may be selectively employed by a structure or material with a preselected Young's modulus to resist extension of the hanging member 108 and also to bias the hanging member 108 to return to the stowed position 112 in the absence of an article suspended therefrom of sufficient weight. For example, the location and amount of forces or resistance thereto for retention member 108, protuberant portion 120, pivot point 132, the weight and center of gravity of hanging member 110, and the like may all be suitably adjusted to arrive at an at-rest equilibrium requiring an easy, yet sufficient force, easily induced by an adult of average strength to induce the elastic deformation or deflection to allow hanging member 110 to transit to the operative position 114. Upon removal of a purse, jacket, or other article therefrom, at the natural conclusion of use of the hanging member 110, the elasticity or resiliency of the deformable or deflectable retention member 108 may bias the hanging member 110 back into a safe stowed position 112.

The second recessed portion 106 of the housing 100 is formed with a complementary structure, preferably formed as a resilient cutout element or retention member 108 that serves much like a leaf spring element. A pocket space is defined between a terminal end 126 of the cutout element and an opposing part of the recessed portion (second recessed portion 106), such that when the hanging member 110 is stowed into the first and second recessed portions 104, 106, the hanging member's 110 protruding ridge 120 engages the pocket space. Hanging member 110's protuberant portion or protruding ridge 120 may be formed with any suitable shape to impart a resistive force when brought into engagement with the retention member 108. For this purpose, retention member 108 and protruding ridge 120 should be complementary portions. The protruding ridge 120 is suitably dimensioned relative to the pocket space that it fits into and relative to the amount of force required to transition the hanging member 110 between the stowed position 112 and the operative position 114.

The protruding ridge or protuberant portion 120 (in the stowed position 112 of hanging member 110) is effectively wedged in the pocket space and held there by edge engagement against the retention member 108 as seen in FIG. 4B. The retention member's 108 edge engagement provides a frictional hold on the hanging member 110 to keep it in place, absent a suitable disturbing force exceeding the frictional retention force. When such a disturbing force exceeding the frictional retention force, such as by a user's manipulation of the hanging member 110, is applied, the resiliency of the retention member 108 permits the protuberant portion 120 to disengage therefrom and be pivotally pulled outward. Retention member 108, owing to its resiliency, then returns to its initial position. Thus, when the hanging member 110 is to be placed in its operative position 114, the user only needs to press or pull a portion of the hanging member's 110 exposed outer surface to defeat the retention force and free the hanging member 110 for outward pivotal extension and subsequent supportive use thereof.

The protruding ridge or protuberant portion 120 is preferably rounded or ramped to allow the retention member 108 to easily release the protruding ridge 120 when deflected so as not to excessively hinder the hanging member 110 when pulled out to its operative position 114 from the stowed position 112. The retention member 108 has enough resilience that it elastically deforms in a deflective bend and allows the protruding ridge 120 to disengage and then resiliently and elastically resumes its previous position and shape. The principle of operation is much like a tire being stopped by wedging a surmountable block of wood in front of the tire. The relatively small piece of wood provides sufficient resistance to retain the tire in position absent enough opposing force. Nonetheless, a sufficient push enables the retention to be defeated driving the tire over the wedge. Similarly, the retention member 108 provides a relatively small amount of resistance to hold the hanging member 110 in stowed position 112 and maintain the equilibrium thereof. Due to the cross-sectional arcuate roundness or undulation of the protruding ridge or protuberant portion 120, the resistance is relatively easy to defeat when an external force is applied. The retention member 108 provides a stiff, yet somewhat flexible panel, and when the protuberant portion 120 is pushed out of engagement by the bottom edge, the retention member 108 flexibly gives way by plastic deflective deformation—thereby permitting reconfiguration of the hanging device where hanging member 110 transitions from stowed position 112 to operative position 114.

The protuberant portion 120 is suitably dimensioned relative to the pocket space between retention member 108 and the lower supportive wall 124. Retention member is resiliently deflected to accommodate the protruding ridge fully within the pocket space in stowed position 112. The deflection provides sufficient resilient bias to retain the protuberant portion 120 thereby retaining the hanging member 110 in its stowed position 112. To transition the hanging member 110 into its operative position 114 from its stowed position 112, a user presses the second portion 118 (below pivot point 132) of hanging member 110 or pulls the first portion 116 (above the pivot point 132) of the hanging member's 110 exposed outer surface to defeat the resilient retention and free the hanging member 110 for outward pivotal extension into operative position 114.

In one embodiment, the hanging apparatus includes a housing 100 and a hanging member 110. The housing 100 includes a frame portion 102 with a first recessed portion 104 and a second recessed portion 106 formed therein. The housing 100 includes a retention member 108 disposed in proximity to the interface of first recessed portion 104 and second recessed portion 106. The second recessed portion 106 defines an inclined support surface 124. The hanging member 110 is pivotally coupled to the housing 100 via a pin 130 at pivot point 132 for angular displacement between the stowed position 112 and an operative position 114 relative to the housing 100. The hanging member 110 includes a first body portion 116 and a second body portion 118. There is at least one protuberant portion 120 preferably formed proximate the joint formed by the first body portion 116 and the second body portion 118. The second body portion 118 is also sloped to define an inclined countersupport surface 123. The inclined countersupport surface 123 bears against the inclined support surface 124 of the housing 100 when the hanging member 110 is in the operative position 114, and the protuberant portion 120 deflectively engages the retention member 108 of the housing 100 when the hanging member 110 is displaced to pass between the stowed position 112 and operative position 114.

A terminal end 126 of the retention member 108 is spaced apart from the second recess portion 106 of the housing 100 defining a gap or pocket space therebetween. The terminal end 126 preferably has a tapered profile 128 for smooth engagement or disengagement of the protuberant portion 120 when the hanging member 110 is displaced between the stowed position 112 and the operative position 114. Protuberant portion 120 may take any form suitable to complement the pocket space defined by the terminal end 126 of retention member 108 and an opposing portion of the second recessed portion 106.

When the hanging member 110 is being displaced by a user, at an intermediate position (as depicted in FIG. 4C) of the displacement, the protuberant portion 120 abuts the terminal end 126 to tangentially displace the retention member 108. At the origin or end of the displacement, the protuberant portion 120 is contained within the gap or pocket space, and the hanging member 110 remains flush with the frame portion 102 of the housing 100. In turn, the frame portion 102 is preferably installed to extend over a wall or other support surface in low profile, near flush manner.

When the hanging member 110 is received in the recessed portion formed by the first recessed portion 104 and second recessed portion 106, the hanging member 110 defines a substantially flush planar profile with the frame portion 102. The hanging member 110 is substantially retained within the recessed portions 104 and 106 at an intermediate position therebetween by a pin 130 for engagement through hole 132 acting as a pivot point for hanging member 110.

In certain embodiments, the hanging device is an assembly configured to be substantially flush-mounted to a wall surface such as by removing a portion of the wall suitably dimensioned to accommodate the portion of the hanging device behind the planar surface of frame 102. The hanging assembly includes a surface mountable structure having a planar front surface 102 defining a groove (104 and 106 collectively) formed therein. The groove 104, 106 has a first side wall and a second side wall extending from a rear wall. A hook member 110 is configured to displaceably couple within the groove 104, 106 between the first and second side walls. The hook member 110 is displaceable between an extended position 114 and a retracted position 112. The hook member 110 is preferably formed with a substantially straight front surface that flush mounts to the surface mountable structure 100 when the hook member 110 is in a retracted position 112 and a back surface having a straight surface and an inclined surface 123 defining an angle therebetween. A protrusion 120 is formed about the joint connecting the straight and the inclined surfaces 123 of the back surface. A resilient tab 108 peripherally defined by a substantially U-shaped cutout contoured on the rear wall of frame 102 engages the protrusion 120. The resilient tab 108 may be peripherally contoured with any other suitable cutout shape so long as its deflective properties are suitable preserved. The resilient tab 108 is preferably configured thereby much as a leaf spring structure that deflects when the hook member 110 is extended or retracted. A support portion 124 is integrally formed in the rear wall at an incline complementary to the inclined surface 123 of the hook member 110 for providing counter force to keep the hook member from extending beyond a predetermined angle and to support the weight of articles placed thereon.

Figure 1A:
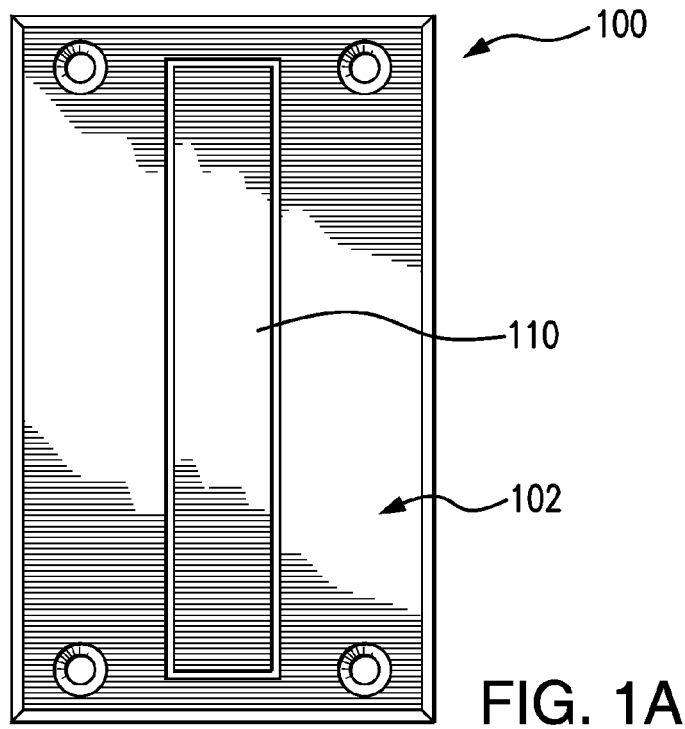
FIG. 1A is an exemplary plan diagram illustrating a front view of the hanging device in an exemplary embodiment of the present invention.
Figure 1B:
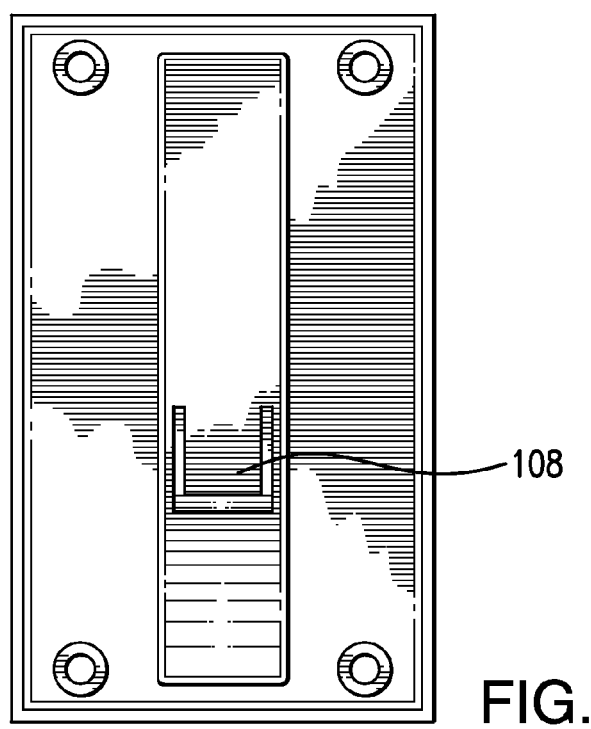
FIG. 1B is an exemplary plan diagram illustrating a back view of the indoor hanging device depicted in FIG. 1A.

When the apparatus is installed in a given surface, it includes the housing body 100 which has a frame portion 102 that is preferably formed to resemble a wall plate for a light switch excepting the central portion defining a recess. As seen in FIGS. 1A and 1B, the frame 102 is preferably provided with a plurality of screw holes 127 formed therein. In a preferred installation, housing 100 is inserted into a complementarily dimensioned gap in a wall and secured thereto with screws. In alternate embodiments, in lieu of such screw-fastening measures, the frame portion 102 (or other suitable portion) of the housing 100 may be secured to the given wall or other supporting surface using adhesive, mechanical latching, hook and loop, or any other suitable fastening measures known in the art.

Such integrated installation provides a solid base to support heavy articles hanging from the hanging member 110. Towards the bottom (about one third of the distance from the bottom to the top of the recess—as illustratively shown in the Figs.), the rear wall of the recess forms the inclined support surface. The inclined face serves as a stopping surface engaged by the bottom 118 angled portion 123 of the hook 110. Above that portion, a straight recessed section is terminated at its bottom end by the cut flapper or retention member 108 which forms a leaf spring-type structure—a structure that provides sufficient resilience—such that when the peg/hook 110 is recessed into the housing 100, the protruding ridge 120 of the peg 110 pushes back and inserts within a pocket space between the end of the cut flapper 108 and the rest of that recessed portion 124.

Surrounding the cut flapper retention member 108 on either side of the recessed area 104, 106, aligned openings 132 are provided in the inner side walls. These openings 132 preferably serve in the illustrated embodiment to retain a pin 130 which defines the pivot for the peg or hanging member 110. Alternatively, the peg 110 itself may be formed of bulbous bosses or other formations to pivotally engage these openings 132 on either side for stable pivotal displacement relative to the housing 100.

The peg 110 may be snap-fit into displaceable engagement with the housing 100 thereby. Regardless of how the peg 110 is assembled to the housing, the peg is pivotally coupled about a pivot 130 such that it pivots out to its extended support position 114 when in use and pivots back into its recessed position 112 when stowed.

In accordance with certain aspects of the present invention, the peg 110 is kept from falling out arbitrarily (absent user actuation) from the housing 100 when in stowed position 112 and not in use by frictional engagement. However, any biasing force, such as by magnetic attraction in the first portion 116, magnetic repulsion in second portion 118, pneumatic pressure, elastic element, counterweight, or any other suitable retention biasing force may be used. The peg 110 would otherwise pose a hazardous, unsightly, and inconvenient impediment. The cut flapper retention member 108 formed in the recessed portion 104,106 of the body 100 resiliently retains the protruding ridge 120 of the peg 110 so that the peg 110 remains in place when stowed.

Although this invention has been described in connection with specific forms and configurations thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of features or steps may be reversed or interposed, all without departing from the spirit or scope of the invention as defined in the appended Claims.

What is claimed is:

1. A reconfigurable hanging apparatus mounted on a planar mounting surface, comprising:
   a housing having a frame portion and first and second recessed portions formed therein, said housing including a retention member disposed at said first recessed portion, said second recessed portion defining an inclined support surface; and,
   a hanging member coupled to said housing for angular displacement between stowed and operative positions relative to said housing, said hanging member including first and second body portions and at least one protuberant portion formed on at least one of said first and second body portions, said second body portion defining an inclined countersupport surface;
   wherein said inclined countersupport surface bears against said inclined support surface when said hanging member is in said operative position, and said protuberant portion deflectively engages said retention member of said housing when said hanging member is displaced to pass between said operative and stowed positions;
   wherein a terminal end of said retention member is spaced apart from said second recessed portion of said housing to define a gap therebetween, said terminal end having a tapered profile for substantially conformed engagement of said protuberant portion when said hanging member is disposed in said stowed position.

2. The hanging apparatus as recited in claim 1, wherein when said retention member deflects from a base configuration to an intermediate configuration when said hanging member protuberant portion partially engages said gap, said retention member returning substantially to said base configuration when said hanging member protuberant portion fully engages said gap.

3. The hanging apparatus as recited in claim 1, wherein said hanging member in said stowed position is received in said recessed portion of said housing, said hanging member thereby defining a substantially flush outer profile with said frame portion.

4. The hanging apparatus as recited in claim 3, wherein said hanging member in said operative position protrudes out from said housing at a predetermined angle.

5. The hanging apparatus as recited in claim 1, wherein an affixing portion of said hanging member is disposed intermediately between said first and second body portions and pivotally coupled to said frame within said recessed portion.

6. The hanging apparatus as recited in claim 5, wherein said protuberant portion and said retention member are formed substantially proximate a pivotal coupling point of said hanging member.

7. The hanging apparatus as recited in claim 6, wherein said protuberant portion of said hanging member in said stowed position is biased therein by a deflective retention force of said retention member.

8. The hanging apparatus as recited in claim 1, wherein a terminal part of said retention member is peripherally defined by a U-shaped cutout formed in a rear wall of said first recessed portion of said frame to be resiliently suspended therefrom.

9. The hanging apparatus as recited in claim 8, wherein said protuberant portion includes an arcuately profiled ridge disposed transversely across said hanging member.

10. The hanging apparatus as recited in claim 9, wherein said frame portion includes a plurality of through-holes each for receiving a fastener therethrough to substantially flush-mount said housing on a planar surface.

11. The hanging apparatus as recited in claim 1, wherein said inclined countersupport surface of said second body portion is configured to engage said inclined support surface of said housing when in said operative position.

\* \* \* \* \*